March 24, 1959  C. A. GRULKE ET AL  2,879,187
PRIMARY BATTERY AND METHOD OF CONTROLLING
THE INITIAL VOLTAGE RANGE THEREOF
Filed April 30, 1954
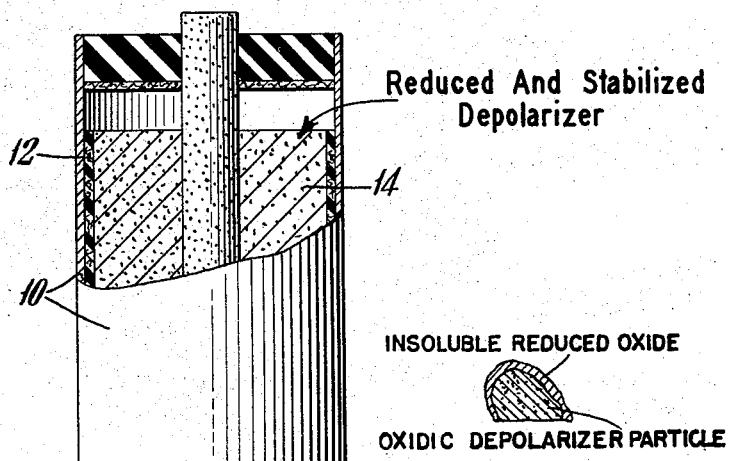
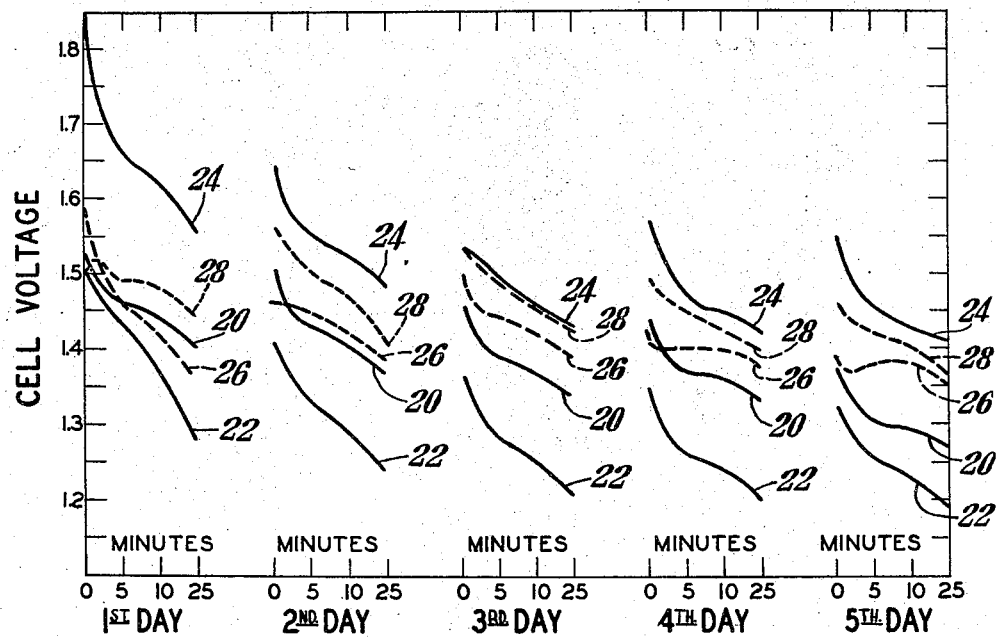
INVENTORS
CARL A. GRULKE
RUSSELL P. FOX
BY *John F. Hohmann*
ATTORNEY

2,879,187

PRIMARY BATTERY AND METHOD OF CONTROLLING THE INITIAL VOLTAGE RANGE THEREOF

Carl A. Grulke, Berea, and Russell P. Fox, Fairview Park, Ohio, assignors to Union Carbide Corporation, a corporation of New York Application April 30, 1954, Serial No. 426,854

1 Claim. (Cl. 136—138)

This invention relates to primary galvanic cells using manganese dioxide as a depolarizer, and to a method for controlling the voltage range of such cells.

Cells of this type having metals other than zinc as their anodes are of rapidly growing interest because of the scarcity of zinc metal, and of the different voltage characteristics, such as flatness of the latter portion of the discharge curve, which is obtainable by their use. Before a cell such as a magnesium cell can be used interchangeably with the commercial zinc cell, it is necessary to reduce its initial voltage to that of the zinc cell, as failure to do so results in deterioration and unnecessary loss of efficiency on the part of the battery-operated equipment.

Previous work evidences the inability of the art to devise simple voltage control methods capable of rendering cells interchangeable. Thus previous attempts to replace zinc electrodes by magnesium electrodes by using either dropping resistors or by modifying the centering voltage of the battery-operated equipment, have been basically impractical because the high peak voltage obtained and its consequent power loss have resulted invariably in reducing the effective service output.

The present invention has for principal object a primary galvanic cell having controllable cathode potential permitting the obtaining of desired initial voltages. Another object is to provide a novel depolarizing mix for primary cells employing magnesium anodes. Its further object is to provide a magnesium cell having essentially the same initial voltage as a commercial zinc cell while retaining its characteristic higher voltage during the final portion of service. Within the term "magnesium" are included alloys of magnesium with metals placed near it in the electromotive series. An example of a suitable alloy is one containing 2% of manganese, and 2% of aluminum.

A still further object is to reduce open circuit anode corrosion, and thereby improve the shelf life of such cells without using conventional local action inhibiting means.

In the drawing, Fig. 1 is a sectional, elevational view of a cell embodying this invention. Fig. 2 is a graph showing typical voltage curves for such a cell. Fig. 3 is an enlarged cross-sectional view of an individual depolarizing particle coated according to the present invention.

The invention by means of which these objects are attained depends on two main effects. Since the situs of the cell reaction is initially at the surface of the depolarizing particles, the initial voltage level can be reduced without affecting the later characteristics of its discharge. In turn, the surface of the depolarizing particles can be reduced to give desired voltage characteristics since the open circuit voltage of a cell decreases as the pH of such particles increases. Reduction of the surface of the depolarizing material is achieved herein by the use of reducing agents compatible with the dry cell components and by controlling the pH of the depolarizing particles.

The normal magnesium cell using a magnesium bromide electrolyte operates at an initial voltage approximately 0.3 to 0.5 volt higher than the commercial zinc cell, while its depolarizing mixture has a pH near 5.1. As an example of the practice of this invention, the initial voltage of such a cell was reduced 0.2 to 0.3 volt and thereby made interchangeable with said zinc cell by the following procedure: 2½% of oxalic acid was intimately mixed with the manganese dioxide powder. Subsequent wetting with the electrolyte caused a surface reduction of the manganese dioxide particles to lower potential $Mn_2O_3 \cdot H_2O$. No chromate inhibitors either in the form of soluble alkali or alkaline earth materials were added.

This mixture was incorporated in a cell of identical construction with the one shown in Fig. 1 in which a cupped magnesium electrode 10 serves as the anodic material; bibulous lining 12; a molded carbon layer forming with the depolarizing mix the cell cathode 14; and the magnesium bromide electrolyte.

This cell was tested initially within 7 days upon assembly and after a delay of 6 to 8 weeks by discharging continuously on a 4 ohm load of 25 minutes daily for five consecutive days. It is apparent from graph curves 20 of Fig. 2 that its initial voltage approximated that of a commercial zinc cell shown by curves 22, while during its final portion of service it substantially retained the higher voltage characteristics of the standard magnesium cell represented by curve 24. Similar results obtained after a 6 to 8 weeks delay as shown by curves 26. Vented cells of like composition also give similar results as indicated by curves 28. The latter portion of the discharge curve in each case is substantially flat.

The method of this invention is amenable to many variations. pH control may be effected in any known manner. Any reducing agent compatible with dry cell components and capable of forming an insoluble layer on the highly oxidized depolarizing mix may be used. Among these formic acid and hydrogen peroxide in amounts of approximately 2% to 3% give the best results. Manganese oxide in amounts ranging from 4% to 6% is also suitable for use in this invention, as it was found that it forms lower potential $Mn_2O_3 \cdot H_2O$ on the manganese dioxide surface as well as controlled the final mix pH. The depth of reduction of the depolarizing oxide to lower potential oxide can be controlled by regulating the amount of the reducing agent used.

While this invention has been described specifically with respect to rendering a cell having a magnesium anode substantially equal in voltage to a cell using a zinc anode, its method generally is equally amenable to rendering interchangeable cells having other anodes.

Related subject matter is disclosed and claimed in our co-pending applications, Serial numbers 426,853, now Patent 2,820,730, Jan. 21, 1958, and 426,855.

What is claimed is:

A primary galvanic cell comprising a carbonaceous cathode, an electrolyte, a consumable metal anode having an electrode potential less than that of zinc, and an oxidic depolarizer ore consisting of manganese dioxide ore and from 2 to 6 percent of an agent selected from the group consisting of formic acid, oxalic acid, hydrogen peroxide and manganous oxide, said ore being pre-coated with a lower oxide of manganese, such oxide having a potential less than the potential of manganese dioxide, the pre-coated manganese dioxide being stabilized by adjusting the pH value thereof to obtain an initial voltage substantially equal to the initial voltage of a conventional zinc-carbon cell.

(References on following page)

References Cited in the file of this patent

UNITED STATES PATENTS

| | | |
|---|---|---|
| 1,160,907 | Koretzsky | Nov. 16, 1907 |
| 1,221,062 | Kaplan | Apr. 3, 1917 |
| 2,547,907 | Fry et al. | Apr. 3, 1951 |
| 2,678,343 | Daniel | May 11, 1954 |

FOREIGN PATENTS

| | | |
|---|---|---|
| 124,137 | Great Britain | Mar. 20, 1919 |

OTHER REFERENCES

Transactions Electrochemical Society, vol. 53, pages 83 to 92.

Transactions Electrochemical Society, vol. 68, pages 177 to 184.

Mellor, J. W.: "A Comprehensive Treatise on Inorganic and Theoretical Chemistry," Longmans, Green and Company, London, 1932, vol. XII, pages 141, 220, 253, 255, 257–258, 223 and 225.

Vinal, G. W.: "Primary Batteries," John Wiley & Sons, New York, 1950, ed. 3, pages 70–71.

Lange, N. A.: "Handbook of Chemistry," Handbook Publishers, Inc., Sandusky, Ohio, 1949, ed. 7, page 1109.